UNITED STATES PATENT OFFICE.

JACOB S. ROBESON, OF AU SABLE FORKS, NEW YORK.

PROCESS OF MAKING ROADS.

1,075,856.　　Specification of Letters Patent.　　Patented Oct. 14, 1913.

No Drawing.　　Application filed March 6, 1912. Serial No. 682,014.

*To all whom it may concern:*

Be it known that I, JACOB S. ROBESON, a citizen of the United States, residing at Au Sable Forks, in the county of Essex and State of New York, have invented certain new and useful Improvements in Processes of Making Roads, of which the following is a specification.

This invention relates to processes of making roads; and it comprises a process of preparing a highway from materials comprising clay, or clay-yielding materials, such as feldspathic and feldspathoid minerals, such as feldspar, and rocks containing the same, such as granites, gneisses, etc., and rocks containing the feldspathoid minerals, leucite, nephelite, etc., such as the various basalts, traps, etc., as well as such artificial silicates as slags wherein a roadway of such material is treated preliminarily with caustic lime, either as quicklime or as slaked lime, to allow a certain chemical action upon such material to go forward and is thereafter treated with waste sulfite liquor or a preparation thereof; all as more fully hereinafter set forth and as claimed.

Most "dirt" roads are composed of or comprise clay, clay being one of the commonest constituents of all ordinary soils, such as clays, loams, etc., and as is well known, the effect of alternate wetting and drying upon the clay of such roads is to make mud and dust. Clay is a very finely divided mineral material with little bonding power when simply dried down. Hard aggregates or clods of dried natural clay break down under vehicle wheels into the ultimate very fine constituent clay particles which become dust. Macadam roads are frequently made of various igneous and granitic rocks containing feldspathic and feldspathoid minerals which are complex silicates containing alumina and other bases, such as the alkalis. Under the influence of weathering, these complex silicates slowly break down giving clay, (kaolin) and more or less colloid forms of silica and alkali silicates. The latter act as and furnish binding agents for the clay and unchanged mineral. These natural weathering and bonding actions are, however, very slow. But having a binding agent in the material of the road, these macadam roads for this reason, and also because they contain a less amount of fine clay, do not dust quite so freely as dry dirt roads.

It is an object of the present invention to convert the clay component of roads, whether dirt roads or roads made of clay yielding materials, such as described, into a new form neither dusting nor yielding mud freely, and having a good binding power; and to increase and accelerate the breaking down or decomposition of clay-yielding minerals with production of clay and binder to form a dense, compact and sound road bed. In this connection it may be noted that most "clays" and soils or "dirts" usually contain proportions of feldspars and other clay-yielding complex silicates.

In the present invention the road, whether a dirt road or a road macadamized with silicate materials as previously described, is first treated with a limited amount of finely divided calcareous material as by a sprinkling or dusting of lime in some form. This lime is advantageously caustic and may be slaked or hydrated lime, or it may be quicklime. It must be in a state of fine subdivision to enable uniform application of the small amount used. Quicklime is very soon converted into slaked lime in the road surface. Caustic lime applied to the road converts clay into a different physical form and tends to destroy the natural binding power of the clay. This treatment in and by itself as applied to a dirt road would tend to make the road dust even more freely than before. But the lime exercises an action upon clay which makes it better adapted for the next step in the operation. And upon the granitic and igneous rocks of macadam roads and upon the silicate particles in the clay, the lime exercises another specific action in that it attacks the surface of the minerals, producing breaking down products and accelerating the action which would naturally come with weathering. Some results of this attack of the lime upon these minerals are the production of clay, which is changed by the lime as just described in regard to dirt roads, and the production of new forms of hydrated readily reactive silicates. For this action of lime, either upon the clay or upon the rock, the presence of water is necessary. This may be supplied by sprinkling or by rain. The lime application should be allowed to act upon the road for a day or two prior to the next treatment. A lapse of three or four days is advantageous.

The next step is to treat the road surface with waste sulfite liquor or a preparation thereof. In the sulfite process of making paper pulp, wood is heated under pressure with a solution of bisulfites; sometimes calcium bisulfite and sometimes bisulfites of lime and magnesia, dolomitic lime being frequently used for making the solution. About half the wood goes into solution with the bisulfites and there are formed new and complex sulfur-containing organic compounds which are in chemical union with the bases of the sulfite liquor; lime or lime and magnesia. At least to some extent these new bodies appear to have the character of sulfonic acids; to be sulfonic acids derived from the lignone of the wood. For the sake of brevity the characteristic colloid organic solubles of the solution are generally called lignosulfonates of the bases employed; and this term will be hereinafter used. In the waste sulfite liquor as it comes from the digester these solubles evince valuable properties to some extent; but for most purposes the raw or untreated liquor is not commercially useful. But by carefully neutralizing the raw liquor with lime and evaporating at low temperatures, a concentrated product (Patent 833,634) can be obtained in which the organic constituents are substantially not broken up or decomposed but are in far more useful condition. There is some change in them in this operation, since the resulting liquid has more adhesive power per unit of dissolved matter than the original liquor. The concentrated product is also more stable and retains this property even upon redilution. The contained solubles of sulfite liquor are of highly colloid nature and this colloid nature seems to be enhanced in the described operation. But no fundamental chemical alteration of the organic complexes appears to have occurred.

Like many other organic characteristic colloids, the colloid bodies or lignosulfonates of the waste sulfite liquor and particularly of the concentrated product (Patent 833,634) have a specific action upon colloid mineral materials such as are contained in clay, and on the breaking down products of the silicates. One effect of either solution, and particularly of the concentrated solution, upon clay is to change its character physically so that upon drying down it makes hard, dense, coherent bodies of, comparatively, high mechanical strength, not breaking down into dust forming particles as is the case with clay alone. In another and copending application 653,040, filed October 5, 1911, I have described and claimed the utilization of this effect of waste sulfite liquor products upon argillaceous materials, such as clay, for the purpose of producing plastic materials. In still another application 463,709, filed Nov. 20, 1908, I have described and claimed the treatment of roads containing clay with concentrated sulfite waste liquor for the purpose of compacting and converting the road bed into hardened, traffic-resisting masses. I have also found that this sulfite waste liquor material has a specific action upon feldspathic and feldspathoid minerals, increasing and accelerating their decomposition, converting the resultant kaolin into the bodies described and giving sundry additional advantageous binding effects; possibly due to the reaction with colloid alkali-containing silicates so formed. This action is particularly advantageous in the case of roads containing limestone or the like in addition to the feldspathic and feldspathoid minerals. This matter I have described and claimed in my copending application 611,163, Feb. 27, 1911.

I have found that the action of waste sulfite liquor upon clay and clay-yielding materials, such as feldspathic and feldspathoid minerals, and rocks containing the same, is accelerated and improved by the stated preliminary treatment of roads containing the same with small amounts of lime in a finely divided state to produce a preliminary chemical change therein. In the present process therefore, I preliminarily apply a small amount of lime, advantageously caustic lime, uniformly over a preformed road bed to produce the stated preliminary action and render the materials more quickly susceptible to the action of the lignosulfonates; and then apply the lignosulfonate solution, either as the described concentrated product, which may be, and usually is, rediluted to a convenient strength for application, or in the form of some preparation of the sulfite liquor. The original raw or crude sulfite liquor may be applied with advantage but is not so well adapted for the present purposes as the material of Patent 833,634, which, if desired, may be rediluted to a convenient strength for application. Another form or modification of the original sulfite liquor which is highly useful in the present connection is the residual liquor obtained by fermenting waste sulfite liquor and distilling off the resulting alcohol. In this operation the soluble carbohydrates present in the original sulfite liquor are removed, leaving the characteristic contained colloid sulfur containing bodies or lignosulfonates in the residual liquor in a purer state than in the raw liquor. This residual liquor is advantageously further concentrated, giving a product containing the lignosulfonates in readily available condition and well adapted for use as bonding agents.

Where a quick action is desired, it is advantageous to have the lignosulfonates of the solution in a more or less acid condition, or at least to have a solution having an acid reaction. A rapidly acting material may be made by acidifying the concentrated product with sufficient sulfuric acid to liberate free lignosulfonic acid. This treatment produces calcium sulfate which may be removed. Other acid products of good properties can be made by using sodium bisulfate; or mixtures of bisulfate and free sulfuric acid. This gives an acid preparation containing in addition to free lignosulfonic acid some sodium lignosulfonate which is a useful body.

The acidity of the lignosulfonate solution may be that which exists in the sulfite liquor drawn from the digester; i. e. that due to the presence of minimal amounts of free sulfurous acid, or bisulfites, and such raw digester liquor may be used in the present process. But owing to its stability and less colloid, or reactive, character, as well as to its dilution which makes transportation difficult, it is much better to submit the liquor preliminarily to the treatment described in my Patent 833,634, and then subsequently render it acid. Rendering the liquor of acid reaction may be done by replacing the lime present by a base giving acid-reacting salts, such as the sesquioxid bases, alumina, chromium oxid, and ferric oxid. The use of bases of this character for the present purpose with the sulfite liquor has the additional advantage that they render it much more colloid in its character. Salts of sesquioxids with colloid acids are always highly colloid. And I find that the acid-reacting lignosulfonates of iron, aluminum and chromium, are particularly suitable as road binders, in and of themselves. The use of such combinations of the organic matters of sulfite waste liquor with sesquioxid bases upon a road is described and claimed in my copending application Serial No. 463,710, filed Nov. 20, 1908. In forming compositions of this character the concentrated waste sulfite liquor may be treated with a sulfate of the sesquioxid desired to produce calcium sulfate, (which may be removed by filtration, if desired) and the soluble salt, or lignosulfonate, of the sesquioxid in question. For the present purposes the sulfate of calcium may be left in the mixture without much disadvantage, but it is better removed as by filtration. In the case of the iron compound, in lieu of making the ferric compound directly, ferrous sulfate may be employed to produce the ferrous compound of the lignosulfonic acids. In the road this will later absorb oxygen with a production of the sesquioxid and some incidental binding.

Having treated the roadway, whether of clay or clay-yielding minerals as described, with caustic lime and leaving the lime to react upon the road materials for a sufficient length of time, I may then treat the roadway with one of the described acid-reacting sulfite liquor preparations, as by sprinkling the road with a suitably diluted solution. I find with a clay road it is advantageous to treat the road first with about one-half a pound of quicklime, or its equivalent in slaked lime per square yard, and to then sprinkle with water and allow the road to lie for, say, two days. I then treat with one of the described waste sulfite preparations. A quantity corresponding to about three quarters of a gallon of the concentrated liquid of about 30° Baumé may be used for each square yard.

In lieu of the natural silicates described, I may use blast furnace slag. Roads containing blast furnace slag treated according to the present invention undergo changes with lime and with sulfite liquor analogous to those described for the granitic and igneous rocks.

As to the nature of the actions of the sulfite waste liquor preparations described, I am not certain, but they are advantageous for road-making purposes and result in the production of a hard, concrete-like surface, very resistant to traffic and dusting but little. Apparently the organic matters of the sulfite waste liquor in changing the character of the mineral materials are themselves profoundly changed. One result of this change of such organic matters is a conversion into forms, or combinations, which are resistant to water. The colloid matters of sulfite waste liquor are soluble and there are few, if any, chemical reagents which will convert them into an insoluble form, except by such a physical action as by salting out. All the salts of lignosulfonic acid appear to be soluble. But on treating a roadway in the manner described the organic matters become insoluble and resistant to water. On a roadway made in the manner described becoming wet, the organic matters do not leach out, neither does the road become muddy. And by a preliminary treatment with a little lime, the reaction of the sulfite liquor in producing these results is much accelerated. Small applications of powdered limestone, marl, shells, domolite, gas lime, ets. may be used in lieu of caustic lime; but their action upon clay and clay-yielding minerals is slow as compared with that of caustic lime and they are not as well suited as the latter for the purposes of the present invention. The substantially neutral concentrated liquid of Patent 833,634 may be used but the stated acid-reacting preparations act more quickly and efficiently.

What I claim is:—

1. In the treatment of roadways comprising clay or clay-yielding materials, the process which comprises applying small amounts of finely subdivided calcareous matter to a preformed roadway of such material and thereafter treating with a sulfite waste liquor preparation.

2. In the treatment of roadways comprising clay or clay-yielding materials, the process which comprises applying caustic lime to such roadway and thereafter treating with a sulfite waste liquor preparation.

3. In the treatment of roadways comprising clay or clay-yielding materials, the process which comprises applying small amounts of finely subdivided calcareous matter to a preformed roadway of such material and thereafter treating with a sulfite waste liquor preparation having an acid reaction.

4. In the treatment of roadways comprising clay or clay-yielding materials, the process which comprises applying a calcareous material to such roadway, and thereafter treating with an acidified sulfite waste liquor preparation.

5. In the treatment of roadways comprising clay or clay-yielding materials, the process which comprises applying a calcareous material to such roadway, and thereafter treating with an acidified sulfite waste liquor preparation containing some sodium lignosulfonate.

6. In the treatment of roadways comprising clay or clay-yielding materials, the process which comprises applying caustic lime to such roadway, and thereafter treating with a sulfite waste liquor preparation having an acid reaction.

7. In the treatment of roadways comprising clay or clay-yielding materials, the process which comprises applying caustic lime to such roadway, and thereafter treating with an acidified sulfite waste liquor preparation.

8. In the treatment of roadways comprising clay or clay-yielding materials, the process which comprises applying caustic lime to such roadway, and thereafter treating with an acidified sulfite waste liquor preparation containing some sodium lignosulfonate.

In testimony whereof, I affix my signature in the presence of two subscribing witnesses.

JACOB S. ROBESON.

Witnesses:
H. J. LEGGETT,
L. C. BOLLES.